United States Patent [19]

Koga et al.

[11] Patent Number: 5,089,297

[45] Date of Patent: Feb. 18, 1992

[54] METHOD FOR REPAIRING INTERIOR PORTIONS OF A PIPELINE

[75] Inventors: Motoyuki Koga, Tokyo; Nobukatsu Ike; Kenji Ohshima, both of Yamato, all of Japan

[73] Assignee: Hakko Co., Ltd., Tokyo, Japan

[21] Appl. No.: 607,209

[22] Filed: Nov. 2, 1990

Related U.S. Application Data

[63] Continuation of Ser. No. 310,163, Feb. 15, 1989, abandoned.

[30] Foreign Application Priority Data

Feb. 15, 1988 [JP] Japan .................................. 63-32362
Feb. 15, 1988 [JP] Japan .................................. 63-32363
Feb. 15, 1988 [JP] Japan .................................. 63-32364

[51] Int. Cl.[5] .............................................. B05D 7/22
[52] U.S. Cl. ...................................... 427/238; 427/239; 427/385.5; 427/388.1
[58] Field of Search ............ 427/239, 238, 230, 385.5, 427/388.1

[56] References Cited

U.S. PATENT DOCUMENTS

| 4,327,132 | 4/1982 | Shinno | 427/235 |
| 4,370,364 | 1/1983 | Boer | 427/238 |
| 4,526,813 | 7/1985 | Wu | 427/235 |

Primary Examiner—Janyce Bell
Attorney, Agent, or Firm—Armstrong, Nikaido, Marmelstein, Kubovcik & Murray

[57] ABSTRACT

Liquefied resin is supplied into a pipeline having a branch pipe from an end. Mass of the resin is moved by compressed air passing through the pipeline at constant speed, thereby lining inner walls of the pipeline and branch pipe with the resin.

5 Claims, 4 Drawing Sheets

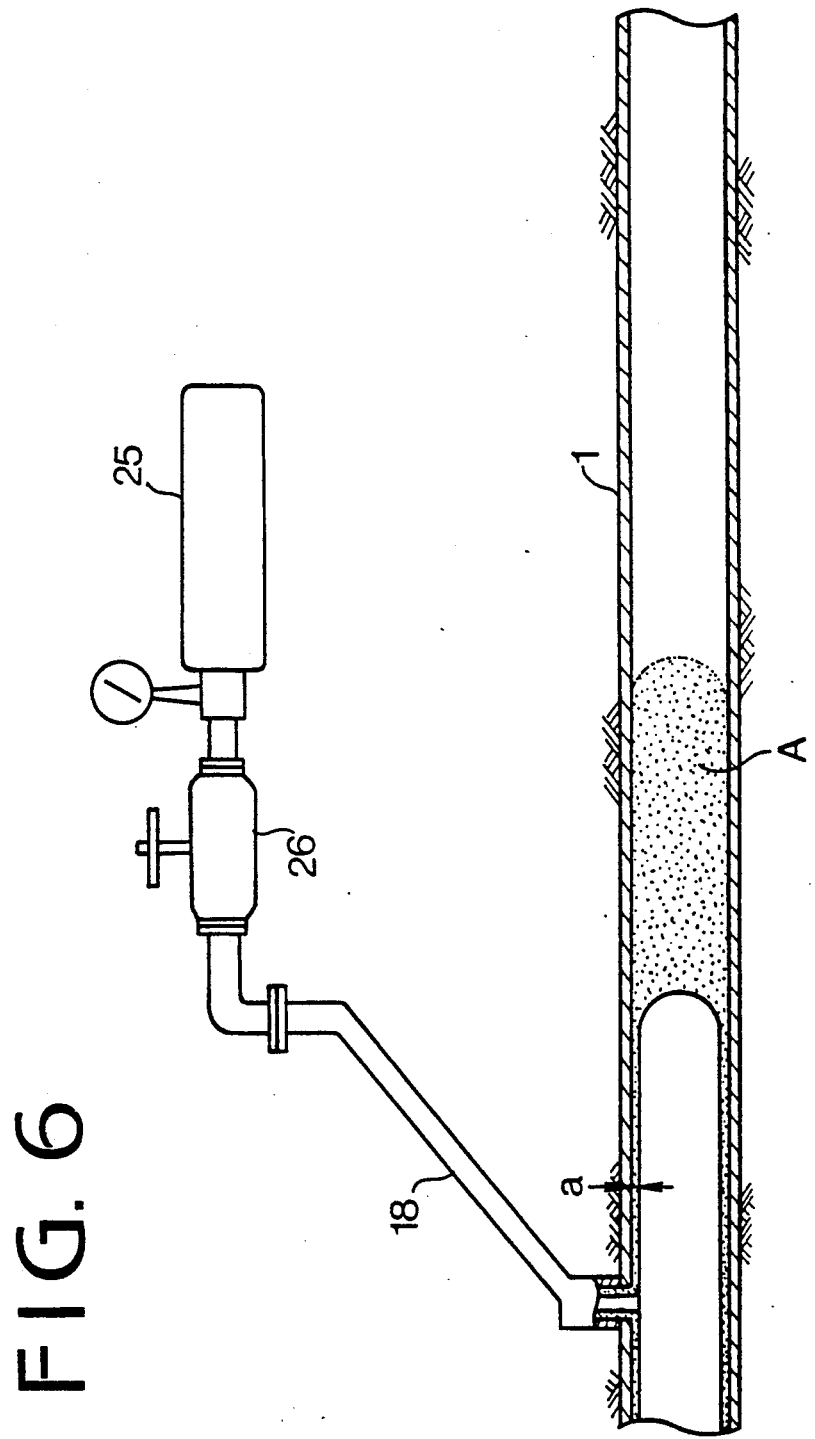

METHOD FOR REPAIRING INTERIOR PORTIONS OF A PIPELINE

This application is a continuation of application Ser. No. 310,163 filed Feb. 15, 1989, now abandoned.

BACKGROUND OF THE INVENTION

The present invention relates to a method for repairing interior portions of a pipeline having branch pipes such as a town gas pipeline or water pipeline. The qualities of pipes and of sealing device of a joint of the gas pipeline deteriorates with lapse of time, which causes leakage of gas from the pipeline Therefore, it is necessary to line the inner surface of an old pipeline with coating material such as resin.

A method of repairing the gas pipeline with pigs has been proposed. The method uses three pigs connected with each other by ropes at suitable distances, a first space between first and second pigs is filled with plastics having a low viscosity as a permeable material, and a second space between second and third pigs is filled with a puttying material The pigs are moved in the pipeline passing through a joint. During the movement of pigs, the plastics permeates into a sealing member such as a gasket in a space of the joint, and then the puttying material is charged in a space between adjacent pipes, substituting for the plastics in the space. Thus, the joint is sealed by the puttying material In the method, the pig is caught at a joint where the diameter of the pipe changes, or at a bend, resulting in clogging of the pipeline and hence it becomes impossible to repair the pipeline. Therefore, the method can be used only under a very preferable condition.

In another method of repairing the pipeline, mist of resin is passed through a pipe line. In the method, only a resin having a low viscosity (for example, under 15,000 cps) can be employed, so that a thickness of a lining is small, at most, 0.5 mm. In addition, the lining on an upper inner surface of the pipeline is thinner than on a lower inner surface. Moreover, the lining becomes thin at an outer inner periphery of a bend where holes are most likely to be formed by corrosion. Accordingly, when resin having a permissively high viscosity is used to decrease the above-described drawbacks, a large amount of air under a pressure over 2 $kg/cm^2$ must be supplied at a large flow rate. As a consequence, not only does a large lining device become necessary, but a large noise is generated so that the method is not suitable in a residential district. Furthermore, when an air pressure more than 2 $kg/cm^2$ is applied to the pipeline, pinholes in the wall of the pipeline which are caused by corrosion are enlarged by the air blowing out therefrom, thereby causing the breaking of the pipe.

SUMMARY OF THE INVENTION

The object of the present invention is to provide a method to lining a pipeline which may line the pipeline with resin at a desirable thickness.

According to the present invention, there is provided a method for repairing of a pipeline having a branch pipe comprising supplying liquefied resin into the pipeline from an end to charge a part of the pipeline with mass of the resin, supplying compressed air into the pipeline from said end to move the mass of the resin passing through the pipeline at substantially constant speed to line the inner wall of the pipe with the resin, repeating the supply of the resin and the compressed air until lining of the pipeline finishes.

In an aspect of the invention, the method further comprises opening an outer end of the branch pipe to pass the mass of the resin through the branch pipe, closing the end when the compressed air flows out from the end, and supplying compressed air from a tank to the pipeline when air flows out from the end of the branch pipe.

The other objects and features of this invention will become understood from the following description with reference to the accompanying drawings.

BRIEF DESCRIPTION OF THE DRAWINGS

FIG. 6 shows a schematic diagram of the lining system when a branch pipe is applied with a pressure.

DETAILED DESCRIPTION OF THE PREFERRED EMBODIMENT

Figure 1:
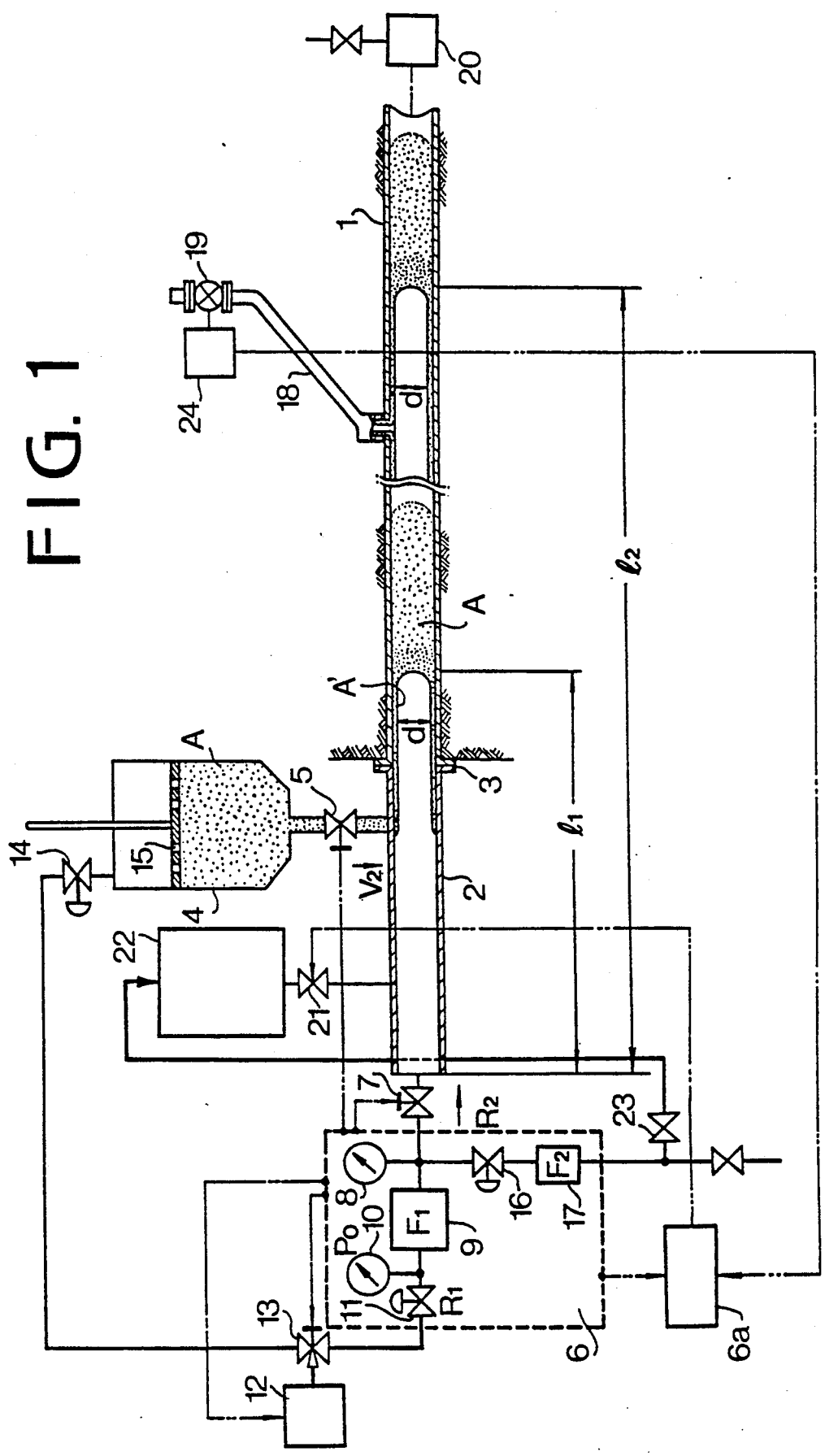
FIG. 1 shows a schematic diagram of a lining system for repairing a pipeline according to the present invention.

Referring to FIG. 1, an underground pipeline 1 is separated into a length suitable for repairing the pipe and both ends of the pipeline are exposed in pits or access holes. Connected to an upper periphery of the pipeline 1 is a branch pipe 18 such as an end supply pipe. A lining system for the present invention comprises a launcher 2 detachably attached to the pipeline 1 through a flange 3, a lining resin injector 4 connected to the launcher 2, an air-flow control system 6 and an air compressor 12 for supplying air to the injector 4 and to the launcher 2 through the control system 6.

The launcher 2 is connected to the resin injector 4 filled with lining resin A through a solenoid operated valve 5. The lining resin A is thixothropic two-part resin comprising main material and hardening material. The main material and hardening material may be premixed and applied to the resin injector 4 by a pressure injector, or may be applied to the resin injector by individual pumps through a static mixer where the materials are mixed.

The injector 4 is communicated with the air compressor 12 through a three-way valve 13 and flow control valve 14. When the three-way valve 13 is positioned to supply compressed air to the injector 4, a slide plate 15 provided therein is subjected to the pressure of the compressed air, thereby forcing a predetermined amount of the resin A to flow into the launcher 2 through the solenoid operated valve 5 at a constant pressure in liquid state.

The rear end of the launcher 2 is connected to the air compressor 12 through a solenoid operated valve 7, air-flow meter 9, flow control valve 11 and the three-way valve 13. The solenoid operated valve 7 is operated in synchronism but in reverse direction to the solenoid operated valve 5. A flow control valve 16 is further provided so as to control air pressure. Pressure gauges 10 and 8 are provided for measuring pressures and air-flow meters 9 and 17 are provided for measuring quantity of air flowing through the valves 11 and 16, respectively. Air-flow meters 9 and 17 are preferably mass air-flow meters so as to obviate influences caused by change in air temperature. Outputs of pressure gauges 8 and 10 and air-flow meters 9 and 17 are applied to a control unit 6a which produces control signals to operate the valves 7, 11 and 16. A surge tank 22 is connected to the launcher 2 through a solenoid oeprated valve 21 and connected to the air supply line through a check valve 23, air-flow meter 17 and valve 16. A resin recovering device 20 is connected to the other end of the pipeline 1.

Reference 18 designates one of branch pipes communicated with the pipeline 1. On the end portion of the branch pipe, an automatically closing valve 19 such as fuse cock is attached, and an operation detector 24 is provided for detecting the closing of the valve 19, the output of which is connected to the control unit 6a.

The lining operation will be described hereinafter. The valve 19 is normally opened. A meter provided at the end of the branch pipe 18 for measuring amount of consumed gas is disconnected, the normally opened valve 19 is attached to the end, and the launcher 2 is connected by way of the flange 3. The three-way valve 13 is positioned to apply compressed air to the injector 4, the solenoid valve 7 is closed and the 10 solenoid valve 5 is opened in accordance with signals from the control unit 6a. The slide plate 15 is downwardly moved by the compressed air to inject the lining resin A into the launcher 2 by a predetermined amount of the resin A in a liquid state at a constant pressure. Thus, a part of the launcher 2 is charged with the resin. Thereafter, the three-way valve 13 is operated to apply air to the control system 6, valve 5 is closed and the solenoid valve 7 is opened. Compressed air having a low pressure from the compressor 12 is fed to the end opening of the launcher 2 through the flow control valve 11, air-flow meter 9 and solenoid valve 7. The compressed air pushes a mass of lining resin A from the back, thereby letting the resin A flow into the pipeline 1, charging an entrance part of the pipeline with the resin.

As the mass of lining resin A passes the pipeline, a part of the resin A adheres on the inner wall of the pipe to form a lining A' having a predetermined thickness. Owing to high viscosity and adhesive strength of the resin A, the lining A' has generally uniform thickness.

Figure 2:
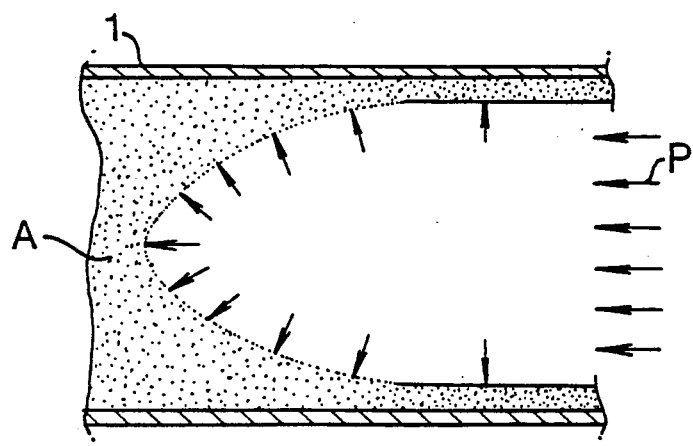
FIGS. 2 and 3 show enlarged diagrams of a pipeline describing difference of thickness of lining.
Figure 3:
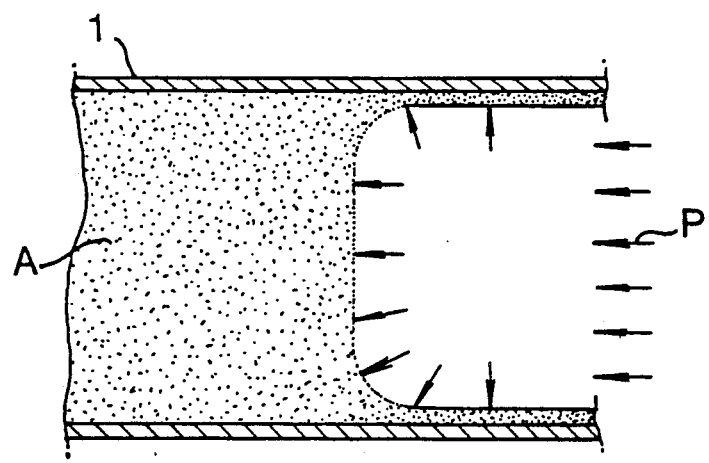

The thickness of the lining A' depends on the flow rate and viscosity of the resin A. For example, supposing that the flow rate V of the resin A is the same, when a resin having a low viscosity is employed, the rear edge of the resin mass, is concaved as shown in FIG. 2. As a result, the lining becomes thick. To the contrary, when resin having a high viscosity is employed, the edge of the mass will be vertical as shown in FIG. 3 so that a thin lining is formed.

Alternatively, if the viscosity is the same, when a high pressure P is applied to the resin A to increase the flow rate, a thick lining is formed as shown in FIG. 2. When pressure P is reduced so as to decrease the flow rate, the lining becomes thin as shown in FIG. 3. Thus, it is experimentally and theoretically confirmed that the thickness of the lining is determined in dependence on the viscosity and flow rate of the resin A.

Therefore, when lining the pipeline, the thickness of the lining is determined and the flow rate of the resin is further determined in accordance with the desired thickness and with various lining conditions such as the diameter and length of the pipe to be repaired, and viscosity of the selected resin. In the present embodiment, the pressure applied to the resin A by the compressor 12 is about 1.5 kg/cm² in an initial stage and decreased by the flow control valve 16 to a low pressure under 0.6 kg/cm² while the resin A is flowing through the pipeline 1. Thus, the pipeline 1 is securely lined without causing air to blow out of holes in the pipe.

As the lining is formed on the inner wall of the pipe, the quantity of the flowing resin A in the pipeline is reduced, so that the flow rate of the resin increases. The operation of the control system 6 for keeping the flow rate of the resin mass constant is described hereinafter.

The flow rate of the resin mass depends on the pressure applied in the pipe and the pressure depends on the amount of air supplied to the pipe and a travelling distance of the resin mass, that is the quantity of the remaining resin. The relationship between the quantity of air and the air pressure in the pipe wherein the lining operation is performed is expressed as follows.

$$\pi/4 \cdot d^2 \cdot l_1 \cdot P_1 = Q_1 \cdot P_O$$

where d is the inner diameter of the lining A', $l_1$ is the distance of the travel of the resin mass at a time $T_1$, $P_1$ is the pressure measured by the pressure gauge 8, $P_O$ is the pressure measured by the pressure gauge 10 and $Q_1$ is the quantity of air flow. The quantity $Q_1$ is a difference between quantity $F_1$ measured by the air-flow meter 17 and quantity $F_2$ measured by the air-flow meter 9. Thus, the distance $l_1$ is obtained as $l_1 = Q_1 \cdot P_O / \pi/4 \cdot d^2 \cdot P_2$. In order to detect the flow rate of the resin mass, the supply of air is stopped for t second, and the pressure $P_2$ after t second is measured by the pressure gauge 8. Accordingly, the travelling distance $l_2$ of the resin mass after t second can be calculated dependent on the following equation, $$l_1 P_1 = l_2 \cdot P_2$$

Accordingly, the flow rate V of the resin mass is calculated dependent on $$V = (l_2 - l_1)/t$$

The flow rate V can be alternatively calculated without stopping the supply of air. That is, the quantity $Q_2$ of the air flow is obtained in dependence on the measured values by the air-flow meters 9 and 17 at a time $T_2$ and the pressure $P_2$ in the pipe at the time $T_2$ is measured and the distance $l_2$ at the time $T_2$ is measured. The distance $l_2$ at the time $T_2$ is calculated dependent on the following equation.

$$\pi/4 \cdot d^2 \cdot P_2 = Q_2 \cdot P_O$$

Namely, $$l_2 = Q_2 \cdot P_O / \pi/4 \cdot d^2 \cdot P_2$$

Thus, the flow rate V can be calculated as follows.

$$V = (l_1 - l_2)/(T_2 - T_1)$$

The control unit 6a applies signals to the flow control valve 1 and 16, thereby keeping the flow rate V constant. As a result a uniform thickness of the lining can be obtained.

Figure 5:
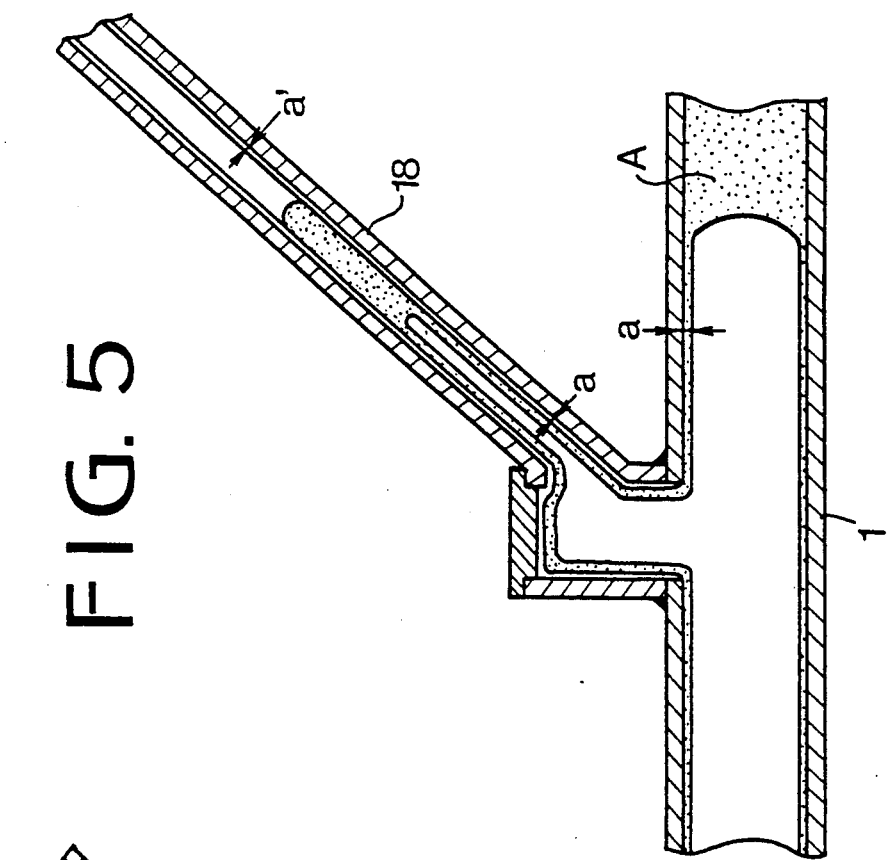
FIGS. 4 and 5 show branch pipes under lining operations.
Figure 4:
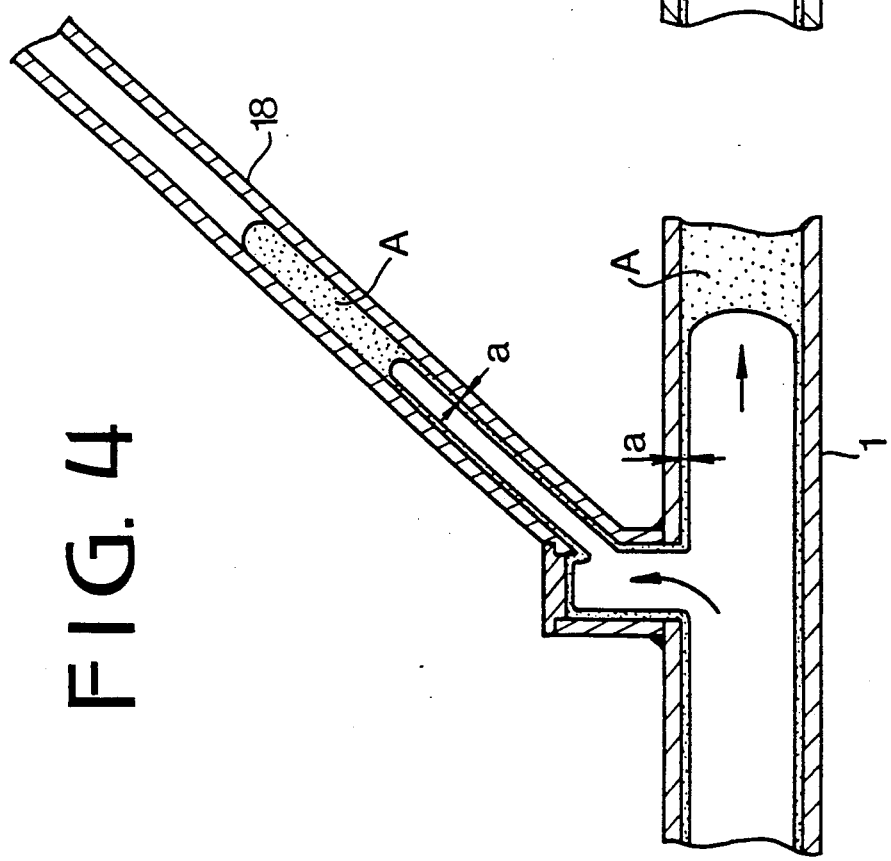

At the branch pipe 18, a part of resin enters into the pipe as shown in FIG. 4. FIG. 5 shows a state where a lining a further formed on a lining a' which has been formed. By the lining of the branch pipe, the quantity of resin in the pipeline reduces. The control unit 6a calculates the reduction quantity as follows.

$$L_2 = ((\cdot R_2/R_1)L_1)/(1+R_2^2/R_1^3)$$

where
- $R_1$ is the radius of the pipeline 1 ($R_1=D_1/2$),
- $R_2$ is the radius of the branch pipe 18 ($R_2=D_2/2$),
- $L_1$ is the length of the lining when the resin reaches the branch pipe,
- $L_2$ is the length of the resin in the branch pipe $L_2$.

If $R_1=25$ mm, $R_2=12.5$ mm, $L_1=100$ cm,
$L_2=45.6$ cm

From the length, the reduction quantity can be calculated.

When the resin reaches the end of the branch pipe, the compressed air flows out from the end, so that the pressure of air in the branch pipe reduces. The automatic valve 19 senses the pressure reduction and closes to prevent the air flow flowing out and the pressure from reducing Thus, the lining operation of the pipeline continues.

The detector 24 detects the closing of the valve 19 and sends a signal to the control unit 6a which operates to open the valve 21 for a predetermined time. Thus, air in the tank 22 is supplied to the pipeline 1, so that reduction of air caused by the flowing out of air from the end of the branch pipe is compensated.

FIG. 6 shows another example of the lining of the branch pipe. A compressed air bomb 25 is connected to the end of the branch pipe through a reducing valve 26, after the completion of the branch pipe lining Compressed air is supplied to the branch pipe from the bomb, thereby preventing the resin from entering into the branch pipe.

When the whole length of the pipeline 1 cannot be lined with a single batch of resin A, resin A is used up to line the inner wall of the pipeline so that the compressed air flows out of the pipe. Therefore, an additional batch of resin is fed at every blow of air through the pipeline until the lining resin A' reaches the pipeline 1. If the mass of the resin is moved on the lining A' at a constant speed, the resin passes the lining A' without adhering to the lining.

From the foregoing, it will be understood that the present invention provides a method for lining pipelines where a pipeline and branch pipes can be lined at a constant thickness. Additionally, the lining operations of the branch pipes and pipeline can be carried out continuously.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for repairing a horizontal pipeline having a branch pipe, comprising the steps of:
    supplying liquefied resin into the pipeline from an end portion to charge a part of the internal portion of the pipeline with mass of the resin;
    causing the difference between pressures at both sides of the mass of the resin in the internal portion of the horizontal pipeline to move the mass of the resin passing through the pipeline;
    controlling the pressure difference as the amount of the moving resin reduces so as to move the mass of the resin at a substantially constant speed to line the inner wall of the pipe with the resin; and
    repeating the step of supplying liquefied resin, the step of causing resin mass movement, and the step of controlling the pressure difference until lining of the pipeline is finished.

2. The method according to claim 1, further comprising the steps of:
    opening an outer end portion of the branch pipe to pass the mass of the resin through the branch pipe; and
    closing the end portion of the branch pipe when the air begins to flow out from an outer end portion of the branch pipe end.

3. The method according to claim 2 further comprising keeping pressure in the branch pipe after the finishing of the lining so as to prevent the resin from entering into the branch pipe.

4. The method according to claim 1, wherein the step of controlling the pressure of the air is performed by reducing the pressure as the amount of the moving resin reduces so as to keep the speed of the resin constant.

5. A method for repairing a horizontal pipeline having a branch pipe, comprising the steps of:
    supplying liquefied resin into the pipeline from an end portion to charge a part of the internal portion of the pipeline with mass of the resin;
    supplying compressed air into the end portion and into the internal portion of the pipeline to move the mass of the resin passing through the pipeline;
    controlling the supply of the compressed air so as to move the mass of the resin at substantially constant speed to line the inner wall of the pipe with the resin, and
    repeating the supply of the resin and the compressed air until lining of the pipeline is finished.

* * * * *